(No Model.)
G. C. BOSTWICK & A. MORLEY.
WHIP.
No. 344,028. Patented June 22, 1886.
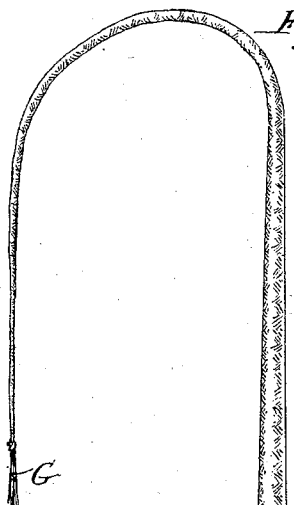
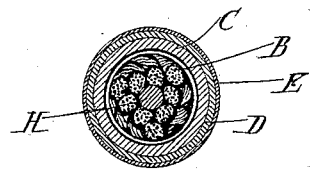
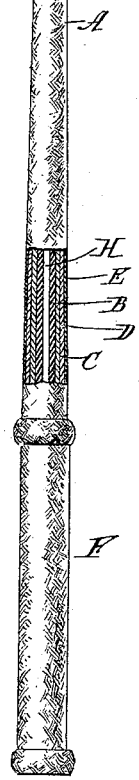
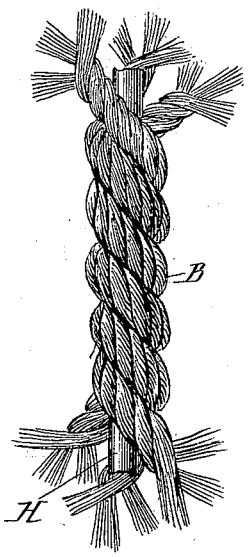
Witnesses:
Frank J. Blanchard
William F. Wiemers
Inventor:
George C. Bostwick
Albert Morley
By Francis W. Parker
Attorney.

UNITED STATES PATENT OFFICE.

GEORGE C. BOSTWICK, OF THREE OAKS, MICHIGAN, AND ALBERT MORLEY, OF CHICAGO, ILLINOIS.

WHIP.

SPECIFICATION forming part of Letters Patent No. 344,028, dated June 22, 1886.

Application filed October 29, 1885. Serial No. 181,227. (No model.)

*To all whom it may concern:*

Be it known that we, GEORGE C. BOSTWICK and ALBERT MORLEY, citizens of the United States, residing, respectively, at Three Oaks, Berrien county, Michigan, and Chicago, Cook county, Illinois, have invented certain new and useful Improvements in Whips, of which the following is a specification.

The object of our invention is to provide an animal-hair stiffener for whips.

Our invention is illustrated in the accompanying drawings, wherein Figure 1 is a side and part sectional view of a whip made according to the principles of our invention, and Fig. 2 is a cross-section of the same. Fig. 3 is a detail of the central stiffener.

Like parts are indicated by the same letter in each figure.

A is the whip; B, the central stiffener. C is the outer stiffener. D is the inner covering. E is the outer or finishing covering. F is the handle, and G is the cracker; H, the core.

The parts of the whip shown are all made in the usual manner, except the central stiffener, which is made of animal hair of any convenient kind and length. This hair may be straight or twisted or composed of a series of twisted or braided strands, which are in turn twisted or braided together to form the central stiffener. This stiffener so formed then has secured about it the outer stiffener, C, composed of a series of strips of suitable wood, gutta-percha, rubber, or similar material. In order that the outer stiffener, or, when that is dispensed with, the covering, may be secured by glue to the central stiffener, the hair of the central stiffener is rubbed with sand or emery-paper to roughen the enamel. The coverings might in some cases be placed directly on the central stiffener. When the outer stiffener is used, it will be turned down to the proper size and shape, and the whip will then be finished in the usual way.

The core H is not at all necessary, except in certain cases, when the whip requires great weight and stiffness. It would usually be dispensed with. The central stiffener is shown composed of three twisted strands each in turn composed of three twisted strands, of animal hair. It may be of any desired length and even extend to the base of the handle.

We claim the following:

1. A whip having a central stiffener composed of animal hair.

2. A whip having a central stiffener composed of twisted animal hair.

3. A whip having a central stiffener composed of a series of twisted strands, each strand being in turn composed of a series of twisted strands of animal hair.

GEORGE C. BOSTWICK.
ALBERT MORLEY.

Witnesses as to Bostwick:
 PETER STREHLE,
 JOHN P. LITTLE.
Witnesses as to Morley:
 F. W. PARKER,
 WILLIAM F. WIEMERS.